Figure 1:
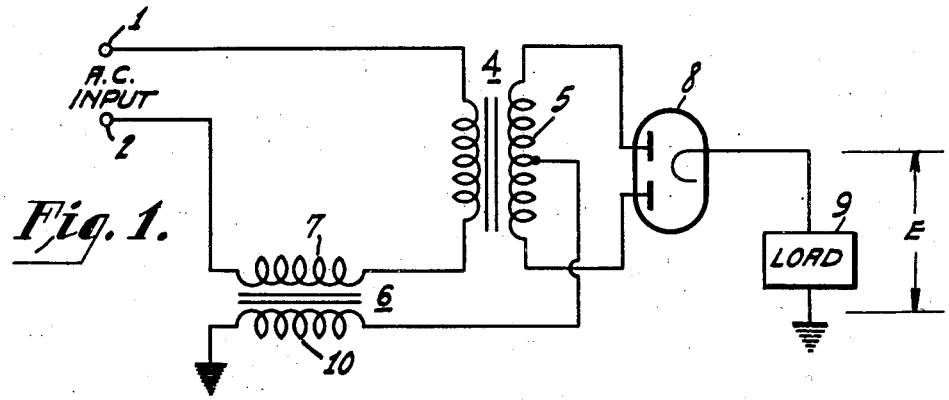

March 29, 1949.　　　J. T. McLAMORE　　　2,465,903

VOLTAGE REGULATION

Filed Feb. 26, 1944

INVENTOR.
JOHN T. McLAMORE
BY
ATTORNEY

Patented Mar. 29, 1949

2,465,903

UNITED STATES PATENT OFFICE 2,465,903

VOLTAGE REGULATION

John T. McLamore, Haddonfield, N. J., assignor to Radio Corporation of America, a corporation of Delaware Application February 26, 1944, Serial No. 524,121

3 Claims. (Cl. 323—87)

This invention relates generally to electrical control apparatus and more particularly to improved methods of and means for controlling voltage in electrical power networks.

Various types of voltage control circuits have been employed heretofore to regulate the voltage applied to a load or to compensate for the voltage drop provided by alternating voltage rectifying apparatus in radio and other power supply networks. Considerable work has been undertaken in the design of magnetic-saturation voltage regulators wherein the reactance of a series reactor winding in an alternating current supply circuit is varied by means of current passed through a second reactor winding which is inductively coupled to the first reactor winding. Numerous reactors of the type described are disclosed in an article entitled "Voltage regulators using magnetic saturation" by K. J. Way in Electronics of July 1937, volume 10 No. 7 at pages 14 to 16, inclusive.

The instant invention comprises novel methods of and means for employing the rectified output of a power supply circuit driven by an alternating current source which includes a series-connected regulating reactor winding of the type described, wherein at least a portion of the rectified alternating current is applied to the second winding of the control reactor to vary the saturation of said reactor for controlling the alternating voltage applied to the rectifying unit.

One embodiment of the invention comprises a conventional power transformer having one winding of the saturable reactor connected in series with an alternating current source connected to the primary winding of the power transformer. Both ends of the secondary winding of the power transformer are connected to anode electrodes of a full wave thermionic tube rectifier. The cathode electrode of the thermionic tube rectifier is connected to one terminal of a load device. A center tap on the secondary winding of the power transformer is connected through the second winding of the saturable reactor to the remaining terminal of the load device. With this arrangement, substantially constant voltage may be applied to the load regardless of the load current, since variations in load current may be made to provide inverse variations in the alternating potential applied to the rectifier, thereby providing an effective means for compensating for poor regulation in the rectifier and power transformer.

A second embodiment of the invention includes an alternating current supply circuit having one winding of a saturable reactor connected in series with one of the alternating current conductors. The alternating current voltage on the load side of the saturable reactor winding is applied, for example, to a voltage-doubling control rectifier network. A predetermined portion of the rectified voltage is voltage stabilized by means of a conventional gaseous regulator tube, and applied, through an adjustable voltage divider, to the control electrode of a first thermionic amplifier tube. The output of the first thermionic amplifier tube is applied to the control electrode of a second amplifying tube which includes the second saturable reactor winding in its anode circuit.

Variation in the rectified voltage applied to the control electrode of the first amplifier tube provides a decreased voltage upon the control electrode of the second amplifier tube which reduces the anode current through the second saturable reactor winding, thereby increasing the effective reactance of the line series reactor, and hence tending to reduce the output alternating voltage applied to the load.

A modification of this embodiment of the invention includes a load connected across the output of a second, or power, rectifier and means for controlling the rectified voltage applied to said load by applying a portion of said rectified voltage to the control electrode of the first amplifier thermionic tube. In both modifications of said second embodiment of the invention, the output voltage may be adjusted over a considerable range by adjustment of the adjustable voltage divider contact connected to the control electrode of the first amplifier tube.

Among the objects of the invention are to provide an improved method of and means for regulating voltages. Another object of the invention is to provide an improved method of and means for compensating for poor regulation in an alternating current voltage rectifying network. Another object of the invention is to provide an improved method of and means for regulating the voltage of an alternating current source applied to a load. A further object of the invention is to provide an improved method of and means for regulating the rectified output voltage of an alternating current source which includes applying a portion of said rectified voltage to one winding of a saturable reactor, a second winding of said reactor being connected in series with said alternating current source.

A still further object of the invention is to provide an improved circuit for controlling the voltage of an alternating current source including a saturable reactor, wherein said alternating voltage is rectified and a portion of said rectified voltage is applied through a thermionic tube amplifying circuit to a second winding of said saturable reactor to vary the reactance of said line reactor as a function of the line output voltage.

Figure 2:
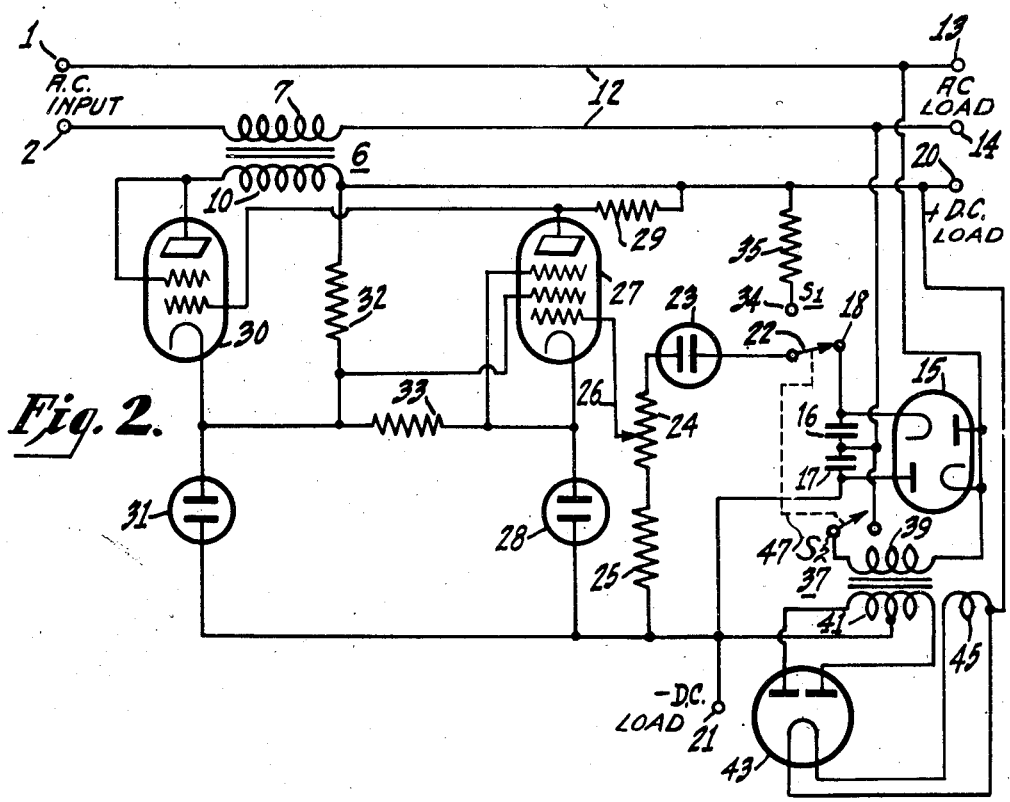

The invention will be further described by reference to the accompanying drawing of which Figure 1 in a schematic circuit diagram of one embodiment thereof and Figure 2 is a schematic circuit diagram of two modifications of a second embodiment thereof. Similar reference characters are applied to similar elements throughout the drawing.

Referring to Figure 1, a source of alternating potential is applied to input terminals 1, 2. Input terminal 1 is connected to one terminal of the primary winding 3 of a conventional power transformer 4 having a center tapped high voltage secondary winding 5. The remaining terminal of the transformer primary winding 3 is connected to one terminal of a first winding 7 of a saturable reactor 6 of the type described in the publication identified heretofore. The remaining terminal of the first saturable reactor winding 7 is connected to the second input terminal 2. The end terminals of the secondary winding 5 of the high voltage power transformer 4 are connected, respectively, to separate anode electrodes of a full wave thermionic rectifier tube 8. The cathode of the thermionic rectifier tube 8 is connected to one terminal of a load 9. The remaining terminal of the load 9 may be connected to ground. The center tap of the high voltage secondary winding 5 of the power transformer 4 is connected through a second winding 10 of the saturable reactor 6 to ground.

This type of control circuit is quite effective for controlling voltage applied to a load such, for example, as a pentode thermionic tube, wherein the anode current is not a direct function of the anode voltage. An increase in load current increases the saturation of the saturable reactor 6 reducing the series reactance of the first saturable reactor winding 7 and hence increasing the alternating potential applied across the transformer primary winding 3. The resulting increased potential applied to the rectifier tube 8 may be employed to compensate for poor regulation in the power transformer 4 and the rectifier tube 8 thereby insuring constant voltage E across the load 9.

Referring to Figure 2, a source of alternating potential is applied to the input terminals 1, 2 of a power line 12. A first winding 7 of the saturable reactor 6 is connected in series with one of the conductors of the power line 12. A load device, not shown, may be connected to the A.-C. output terminals 13, 14 of the power transmission line 12. A voltage-doubling control rectifier circuit includes a double diode rectifier tube 15 having the anode electrode of one diode connected to the cathode electrode of the other diode and to one of the A.-C. line output terminals 13. The remaining cathode and anode electrodes of the double diode tube 15 are connected together, through series capacitors 16, 17. The common terminal of the series capacitors 16, 17 is connected to the remaining A.-C. line output terminal 14. It should be understood that any other type of rectifier network may be employed, providing the output voltage thereof may be employed to energize satisfactorily the control circuits to be described.

The remaining terminal of the first series capacitor 16, which is connected to the diode cathode electrode, is connected to a first fixed contact 18 of a single-pole, double-throw switch S1. The remaining terminal of the second series capacitor 17, which is connected to the anode electrode of the double diode rectifier tube 15, is connected to a negative anode voltage supply terminal 21. The movable contact 22 of the switch S1 is connected, through a conventional gaseous type voltage regulator tube 23, to one of the fixed terminals of a voltage divider 24. The remaining fixed terminal of the voltage divider 24 is connected through a fixed dropping resistor 25 to the negative anode voltage terminal 21. The movable contact 26 of the adjustable voltage divider 24 is connected to the control electrode of a first thermionic amplifier tube 27.

The suppressor electrode and cathode of the first amplifier tube 27 are connected through a second gaseous voltage regulator tube 28 to the negative anode voltage terminal 21. The anode of the first amplifier tube 27 is connected through an anode resistor 29 to the positive anode voltage terminal 20 and also is connected directly to the control electrode of a second thermionic amplifier tube 30. A suitable source of anode operating potential, not shown, is connected to the anode voltage terminals 20, 21. The cathode of the second amplifier tube 30 is connected through a third gaseous regulator tube 31 to the negative anode voltage terminal 21. A fixed voltage divider, comprising series-connected resistors 32, 33 is connected between the positive anode voltage terminal 20 and the cathode of the first thermionic amplifier tube 27. The screen electrode of the first thermionic tube 27 and the cathode of the second thermionic tube 30 are connected to the common terminals of the series-connected voltage-dividing resistors 32, 33.

The screen electrode and anode of the second thermionic amplifier tube 30 are connected together, and connected through the second winding 10 of the saturable reactor 6 to the positive anode voltage terminal 20.

In operation, the alternating voltage at the A.-C. output terminals 13, 14 is rectified and effectively doubled by means of the thermionic rectifier tube 15 and the series capacitors 16, 17. When the movable contact 22 of the switch S1 is connected to the switch contact 18, the rectified voltage applied to the control electrode of the first thermionic tube 27 will be substantially directly proportional to the magnitude of the alternating voltage applied to the A.-C. output terminals 13, 14. An increase in the A.-C. output voltage at the terminals 13, 14 therefore will increase the positive bias applied to the control electrode of the first amplifier tube 27, thereby reducing the voltage applied to the control electrode of the second thermionic tube 30. As the control electrode of the second thermionic tube 30 is driven more negative, the tube anode current through the second saturable reactor winding 10 is decreased, thereby correspondingly increasing the reactance of the line series reactor 7 and hence reducing the alternating voltage applied to the A.-C. output terminals 13, 14.

If desired, a load device may be connected between the D.-C. anode voltage terminals 20, 21 instead of between the A.-C. output terminals 13, 14, as described heretofore, and an additional power rectifier circuit may be provided to supply anode and load direct voltages.

The power rectifier circuit comprises a conventional power transformer 37 having its primary winding 39 connected through a second switch S2 to the A.-C. output terminals 13, 14. The end terminals of a center-tapped high voltage secondary winding 41 are connected to the anodes of a full-wave thermionic rectifier tube 43. The secondary winding center tap is connected to the negative voltage terminal 21. The cathode of the full-wave rectifier tube 43 is energized from a low voltage transformer secondary winding 45, and is connected to the positive voltage terminal 20. If desired, the switches S1 and S2 may be ganged as indicated by the dash line 47, so that the power rectifier circuit only is energized when the movable contact 22 of switch S1 is connected to the fixed contact 34. Of course, if desired, the power rectifier may be substituted for the external anode voltage source, not shown, and the switches thus operated independently.

In order to control a D.-C. voltage thus applied to the terminals 20, 21, the movable contact 22 of the switch S1 may be thrown to the second fixed contact 34 which is connected to the positive D.-C. terminal 20 through a relatively high value registor 35. Thence the control circuit is directly responsive to the voltage across the D.-C. terminals 20, 21 instead of to the voltage provided on the output of the voltage doubling rectifier network.

Thus the invention described comprises improved methods of and means for regulating the A.-C. or D.-C. voltage applied to a variable load device wherein the load voltage is rectified and a portion of the rectified voltage is employed to vary the reactance of a saturable reactor serially connected with the A.-C. power source.

I claim as my invention:

1. A voltage regulator including an input circuit for connection to a source of alternating potential, an alternating current output circuit for connection to a load, a direct connection between said input and output circuits, a saturable reactor having a plurality of windings, one of said windings being serially interposed between said input and output circuits, a control circuit in shunt with said output circuit including rectifier means connected to said output circuit, and means responsive to said rectifier means for applying a control potential to another of said windings of said reactor to regulate the alternating potential applied to said output circuit and to said rectifier means.

2. Apparatus according to claim 1 including a thermionic tube amplifier energized from and responsive to said rectifier means, and means for deriving said control potential from said amplifier for application to said other reactor winding.

3. Apparatus according to claim 2 wherein said rectifier means comprises a voltage multiplying device and wherein said amplifier includes a plurality of direct-coupled voltage regulated amplifier stages connected in cascade arrangement.

JOHN T. McLAMORE.

REFERENCES CITED

The following references are of record in the file of this patent:

UNITED STATES PATENTS

| Number | Name | Date |
| --- | --- | --- |
| 1,834,416 | Osgood | Dec. 1, 1931 |
| 2,018,348 | Dijksterhuis | Oct. 22, 1935 |
| 2,172,962 | Montgomery | Sept. 12, 1949 |
| 2,186,222 | Wilcox | Jan. 9, 1940 |
| 2,291,342 | Livingston | July 28, 1942 |